United States Patent [19]

Fontein et al.

[11] 4,202,762

[45] May 13, 1980

[54] PROCESS AND DEVICE FOR THE AERATION OF WASTE WATER

[75] Inventors: Freerk J. Fontein, Heerlen; Hubertus F. Jennekens, Geleen, both of Netherlands

[73] Assignee: Stamicarbon, B.V., Geleen, Netherlands

[21] Appl. No.: 969,963

[22] Filed: Dec. 15, 1978

Related U.S. Application Data

[63] Continuation of Ser. No. 794,023, May 5, 1977, abandoned, which is a continuation-in-part of Ser. No. 437,477, Jan. 28, 1974, abandoned.

[30] Foreign Application Priority Data

Jan. 29, 1973 [NL] Netherlands ................ 01201/73

[51] Int. Cl.$^2$ .................................. C02C 1/10
[52] U.S. Cl. ................................ 210/3; 210/14; 210/197; 261/36 R; 261/119 R
[58] Field of Search ............... 210/8, 13–15, 210/198 R, 199, 220, 197, 60, 194, 3–7; 261/36 R, 77, 119 R, DIG. 75

[56] References Cited

U.S. PATENT DOCUMENTS

| 1,734,011 | 10/1929 | Harrison | 210/14 |
| 2,126,164 | 8/1938 | Anderson | 261/36 R |
| 2,633,436 | 3/1953 | Martin | 261/36 R |
| 3,997,437 | 12/1976 | Prince et al. | 210/220 |

FOREIGN PATENT DOCUMENTS

| 2404198 | 8/1974 | Fed. Rep. of Germany | 210/220 |
| 2076672 | 10/1971 | France | 210/194 |
| 308254 | 6/1930 | United Kingdom | 261/DIG. 75 |

*Primary Examiner*—Benoit Castel
*Attorney, Agent, or Firm*—Cushman, Darby & Cushman

[57] ABSTRACT

Waste water containing suspended biologically active sludge and circulating in an endless path in a vessel is aerated by withdrawing a stream of the water and recycling it to the vessel in the form of a plurality of downwardly directed jets which penetrate the water surface and thereby entrain air in the water. The jets are directed onto the water surface at an angle of less than 60° and the horizontal component of the motion of the jets is substantially parallel to the recirculation path of the main body of water at the point of impact. The jets are divided regularly over the water surface of the vessel and the energy being imparted to the total number of water jets being at least 2 W per m$^3$ of water contained in the vessel.

15 Claims, 4 Drawing Figures

PROCESS AND DEVICE FOR THE AERATION OF WASTE WATER

This is a continuation, of application Ser. No. 794,023 filed May 5, 1977 which is a continuation-in-part of application Ser. No. 437,477, filed Jan. 28, 1974, both now abandoned.

The present invention relates to the aeration of a circulating body of waste water containing suspended biologically active sludge, by means of a plurality of jets of recycled water, which are supplied to the body of water from above the surface thereof and at an angle to the surface.

When waste water is purified by an aerobic digestion method, two interrelated problems are of particular importance. It is necessary that the power consumption applied for introducing the oxygen needed for the aerobic processes, e.g. in the form of air, should be kept at a minimum. It is also necessary to keep the active sludge containing microorganisms in suspension with a minimum consumption of power, both during normal operation and in the case that the amount of oxygen dispersed into the water has to be reduced because of a decrease in the load of the purifying plant.

According to a known method, as described in U.S. Pat. No. 1,734,011, water is supplied in jets which are directed normal to the surface of a body of water in a vessel. As the waterjets penetrate the surface of the water, air is entrained, which then becomes dispersed in the body of water. This method makes it possible to aerate the water and to keep the solids contained in it in suspension.

The use of this method in biological processes of purifying waste water is attended with drawbacks. If a vessel of considerable depth is used, that means more than 1 or 2 meters, the dispersing effect of the waterjets will be inadequate. The biologically active sludge will settle and be prematurely removed from the area where the purifying action takes place. Furthermore, because of the direction of the jets, which are normal to the water surface, it is virtually impossible to use these jets in a large installation. To get a good suspending effect it is then necessary to install a large number of jets across the water surface, resulting in a fine meshwork of feed tubes across the vessel. This makes the operation of the process, the distribution of equal amounts of water over the plurality of the jets and subsequently the maintenance of the equipment difficult.

A further disadvantage is that the residence time of the water treated by each jet is unequal, which is undesirable.

According to a further known method, described in German Pat. application No. 1,932,640 a propeller or other mixing blade is used to provide the suspending effect. A number of waterjets are directed at an angle to the liquid surface, from some low height above it, for introducing oxygen into the water. If the water jets are directed at an angle of about 60° to the water surface, the introduction of air will be optimum. When directed at this angle, the waterjets exert a slight propelling action on the body of water, but according to this application, this is insufficient to maintain the sludge in suspension, especially in the generally oblong, annular aeration tanks usually employed. Therefore, in this case, the use of a propeller is always necessary to keep the water in adequate motion, which raises the investment and maintenance costs.

According to yet other known proposals the function of introducing oxygen and the function of keeping the sludge suspended are combined in one device. Examples in point are the partly immersed horizontal or vertical brush-type aerators and various types of surface aerators with vertical axis.

The object of the present invention is to provide an improved system for obtaining proper aeration and effective suspension of the solids in the liquid to be treated in a simple and economical way.

According to the process of the invention, a body of waste water contained in a vessel, with biologically active sludge suspended in the water, is aerated by means of a number of jets of recycled water, which are projected downwardly into the body of water from above the surface of the water and at an angle to the water surface, while the main body of water is continuously circulated. The invention is characterized in that the waterjets hit the surface at an angle not greater than 60° and at a velocity of 3 to 12 meters per second, so that the horizontal component of the jet motion is parallel, at least substantially, to the main direction of the circulating flow in the vessel at the point where the jet strikes the surface of the water. The waterjets are divided regularly over the surface of the basin, by means of at least one radially positioned water distributor tube, the energy that is imparted to the total number of water jets is at least 2 W per m$^3$ of water contained in the vessel, and the supply of the waste water to be treated is effected in the suction line of the pump generating the waterjets.

The above combination of features, some of which are known per se but do not produce the desired effect, results in a very efficient introduction of oxygen and suspension of sludge. Moreover, the power consumption required for reaching a given purification result is lower than it is with the known methods. While retaining a sufficiently high suspending power, which is related to the flow rate in the vessel, it is possible to introduce oxygen with an efficiency, expressed in kilograms of oxygen per kilowatt-hour (kg of O$_2$ per kWh) of power expended, that is, at least one and a half times as high as that obtained with the conventional effective vertical-axis surface aerators. The difference is even greater with respect to the widely used brush-type aerators and also with respect to those known systems in which suspension of the sludge and introduction of the oxygen are separate functions. Power is here calculated as the total power required for introducing the molecular oxygen and for suspending the microbiological sludge.

The waterjets must be divided regularly over the water surface in the vessel and an amount of energy of at least 2 W per m$^3$ of water contained in the vessel must be imparted to the total number of waterjets. This amount of energy is necessary to bring about suspension of the biologically active sludge in combination with a regular division of the waterjets over the water surface in the vessel.

This division of the waterjets is brought about in two ways, dependent on the dimensions of the vessel.

The waterjets are generated by a pump connected to a feed-tube or water distributor tube that is positioned horizontally over the water surface. This tube has a number of outflow members, or holes, in the direction of the waterflow in the vessel underneath the tube. The first important thing is that these outflow members are spaced regularly in this feed tube, across the whole of the radius of the vessel. No matter how small the vessel will be (with an exception for very small vessels, used in the research, in the region of 10 m³ or less) this division of the waterjets is necessary. When the process according to the invention is used in large vessels, say over 3000 m³, one water distributor tube is not enough to get the necessary regular division, and two or more of the said tubes are necessary, preferably placed under the same angle to each other. This will be elucidated later on, on the basis of the drawing.

The supply of the water to be treated is preferably effected in the suction line of the circulation pump. This has the great advantage that the process of the invention can be used for the purification of highly concentrated waste water, such as waste water from a fertilizer manufacturing industry or even for the purification of waste water that contains a toxic amount of chemicals, as the fresh supply of waste water is highly diluted and completely mixed with the recirculating body of partly treated waste water.

In a preferred embodiment of the process according to the invention the sludge suspension factor is at least 0.10. This factor determines when the sludge will remain in suspension and is expressed in the following formula:

$$F = K\sqrt{A \cdot 1000/I \cdot (Q \times V \times \cos a)}$$

F = sludge suspension factor
I = surface area of the vessel (m²)
A = number of waterjets
Q = average amount of liquid per jet (m³/s)
V = velocity of liquid in jet (m/s)
α = angle between jet and surface at the point where they meet
K = constant factor, dependent on the shape of the basin.

For a circular basin, K as the value 5/32.
For an elliptical basin, as defined in FIG. 4, K has the value 3/32.

At values of F of below 0.10 the sludge will settle. Of course, the depth of the vessel cannot be infinitively large, but depends on the number of waterjets used and the penetration depth of the waterjets. Generally, the depth of a vessel should not exceed 8-10 meters. The suspending of the sludge and the mainly circulating movement of the waterbody in the basin is caused by the impulse of the jets to the waterbody only as a result of the horizontal and vertical component which can be derived from the impulse. Most effective results are obtained by employing circular basins in which the frictional losses are minimized. In this connection it is preferred to have an overflow velocity of the jets of about 4 to about 8 meters per second.

In spite of the fact that the function of introducing oxygen and the function of keeping the sludge in suspension are combined in one device, it is possible, with the process according to the invention, to control the amount of oxygen imparted without problems regarding the suspending of the biologically active sludge. This is important, as the purification plant will be subject to fluctuations in the load of biologically oxidizable material delivered to the plant. Also generally, the process of the invention offers a great possibility of variation and adjustment to varying reaction conditions.

It has been found that with the process according to the invention it is possible to control the amount of oxygen by controlling the amount of energy used per m³ of water in the vessel. The amount of energy necessary for the aeration of the water is in general, about 10-14 W per m³ of water contained in the vessel. These numbers are typical for a waste water stream of, for example, a chemical industry, or a large city.

This means that in general more than enough energy is imparted to the waterjets to keep the sludge in suspension. However, it is also possible to reduce the oxygen input to a considerable degree by decreasing the amount of energy imparted to the number of waterjets. This amount can be reduced to about 2 W per m³ of water, provided that the waterjets are divided regularly over the water surface in the vessel. The reduction of the amount of energy is preferably brought about by controlling the motorspeed or the position of the impeller blades of the pump.

As the surface area of the reaction vessel becomes larger, with the shape of the vessel unchanged, the advantages of the process of the invention become greater. The reduction of the total power consumption in comparison with the consumption required with the known processes will become increasingly important. Hence, the process of the invention is of particular importance for the large-scale purification of waste water, e.g. purification in vessels having volumes of over 3000 cubic meters.

Even with large installations the process and apparatus remain relatively simple.

The removal from the body of water in the vessel of the water to be recycled through the jets is preferably effected by means of a suction device placed near the wall of the vessel. This arrangement obviates a complicated piping system with bends. In a similar way, the water can be drawn up from the center of the vessel.

As the velocity with which the waterjets leave the outflow openings is increased, the investment cost of a plant of given capacity will be lower. However, the power consumption increases, so that there is an economic optimum for this velocity; in this connection, it is necessary that air input and circulation are sufficient. The optimum range of jet velocity is between 3 and 12 meters per second.

The invention is further embodied in the apparatus for aerating waste water, containing biologically active sludge. This apparatus includes a vessel which can have a variety of cross-sectional shapes such as regular polygonal, circular or elliptical. The vessel will contain a body of waste water kept recirculating in a continuous endless path, a portion of which lies at the surface of the body of water. The apparatus also includes means for withdrawing a stream of water from the vessel and for returning it back to the vessel in the form of a number of downwardly directed jets having a velocity of 3 to 12 meters per second, preferably 4 to 8 meters per second, which jets strike the surface of the water at an angle of less than 60°, thereby penetrating the body of water and entraining air therein, the horizontal components of the different jets direction being substantially parallel to the recirculation path at the point where the jets strike the surface of the water. The means for withdrawing water can include a feed pipe disposed above and parallel to the water surface and a plurality of discharge outlets spaced regularly along the feed pipe which itself is positioned radially across the vessel. The pump used to withdraw water from the vessel and supply it to the feed pipe can have a pump capacity of at least 2 W per m³ of contents of the vessel, and further include supply means for supplying fresh waste water to the suction line of the pump.

Preferably the pump capacity is at least 10 W per m³ contents of the vessel.

In a further preferred embodiment of the invention the pump capacity is such that the amount of water which can be discharged per waterjet (Q) is determined by the formula:

$$Q^2 \geq K_1{}^2 I \cdot d / (1000 A \cdot \cos \alpha)$$

wherein:
Q = expressed in m³/s
$K_1 = 0.1/K$ (as defined hereinbefore)
A = number of waterjets
d = area of liquid outflow members (m²)
α = angle between waterjet and surface
I = surface area of the vessel. (m²)

The invention will be further understood from the following more detailed description of two exemplary embodiments taken with the drawing, in which.

Figure 1:
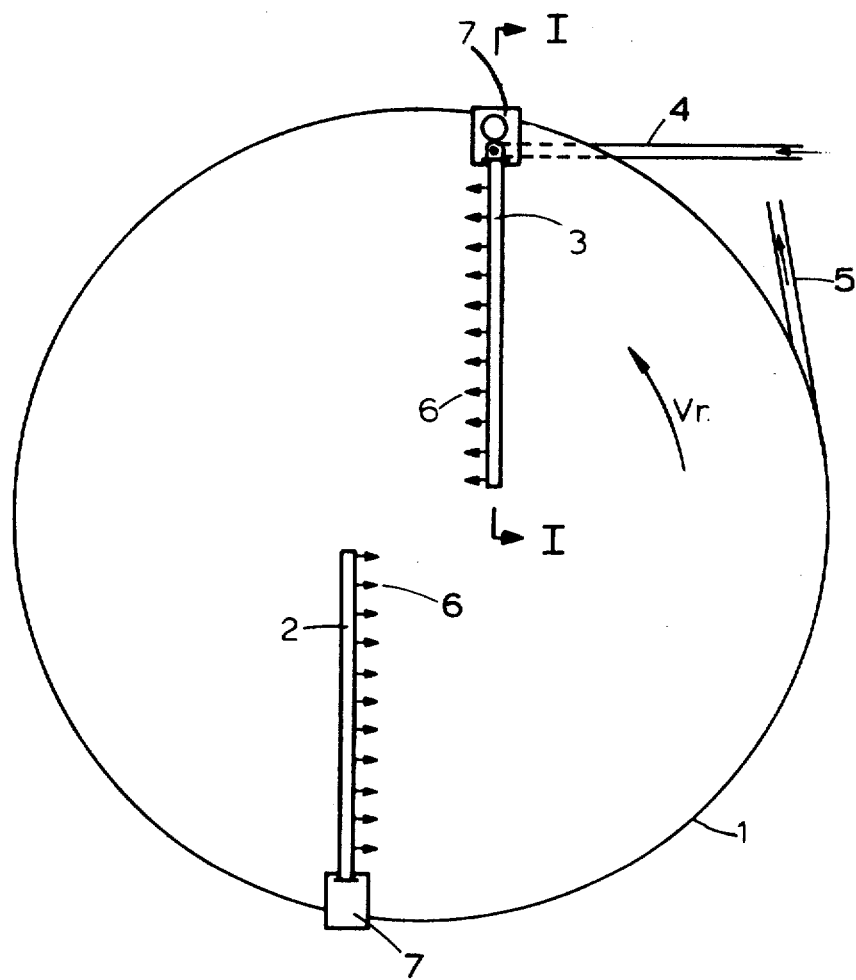
FIG. 1 is a schematic plan view of an embodiment of a plant embodying the principles of the present invention.

FIG. 1 shows a circular cylindrical aeration vessel 1, over which two parallel horizontal feed tubes 2 and 3 for recycles water are mounted in spaced-apart relationship. It is also possible, of course, to install one tube, or three or more. Waste water to be treated enters the vessel 1 through conduit 4, and water which has been treated leaves through conduit 5. The body of water in the vessel continuously circulates as indicated by the arrow Vr. The tubes 2 and 3 are fed by a pump unit 7 which is shown diagrammatically in this figure.

Each of the tubes 2 and 3 has a number of outlet members which face approximately tangential with respect to the respective flow lines Vr. The outermost outlet members 6 are at some distance from the wall of the vessel, to avoid unnecessary frictional losses. The outlet members 6 are so disposed that the outflowing waterjets are at an angle of, say, about 20° to the water surface.

The outlet members 6 can be tube nozzles but preferably are openings in the feed tubes 2 and 3. The use of openings brings a further reduction of power losses. The supply of the water to be treated, which enters the vessel through conduit 4 is effected in the suctionline 14 of the recirculating pump unit 7 for reasons of obviating directly mixing of the oxygen-poor fresh waste water with the main water body in the basin.

Figure 2:
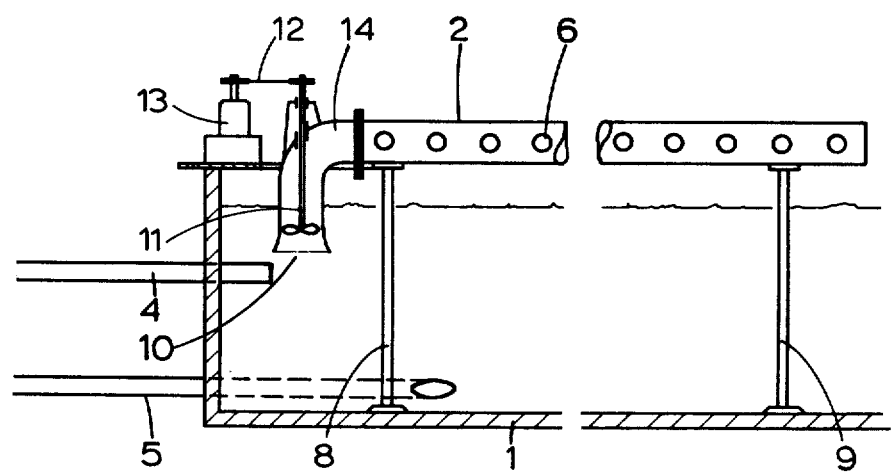
FIG. 2 is a sectional view taken on the line I—I of FIG. 1.

As seen in FIG. 2, the feed tube 2 rests on support 8 and 9, the lower ends of which rest on the bottom of the vessel 1. Tube 2 is connected, by means of flanges at the wall of the vessel 1, to an elbow section 14 having a downwardly facing inlet opening 10 disposed below the surface of the water. Above this opening there is a pump impeller 11 for drawing water from the vessel 1 and delivering it through feed tube 2 and its outlet members 6, in which way the waterjets are formed. The pump unit 7 includes a motor 13 which drives a pump impeller 11 via reduction gear 12. To prevent disintegration of the microbiological sludge, the peripheral impeller velocity is at most about 25 meters per second. The pump unit 7 is mounted near the edge of the basin, which allows for a sturdy and inexpensive construction that is easily accessible for maintenance and inspection while enabling good purifying results to be obtained.

The pumping power applied can be varied as required by opening and shutting the outlet openings 6 for the waterjets, by varying the position of the impeller blades, by controlling the motor speed and by other means.

In FIG. 1 and 2 the regular distribution of the waterjets is clearly illustrated. In FIG. 1, the feed tubes are so positioned that the recirculating body of water receives an impulse from the waterjets after each 180°, whereas in the FIGS. 1 and 2, can be seen that the outlet members of the feed tubes are regularly spaced across the surface so as to give an impulse to the whole body of water contained in the vessel, instead of in only one place.

Figure 3:
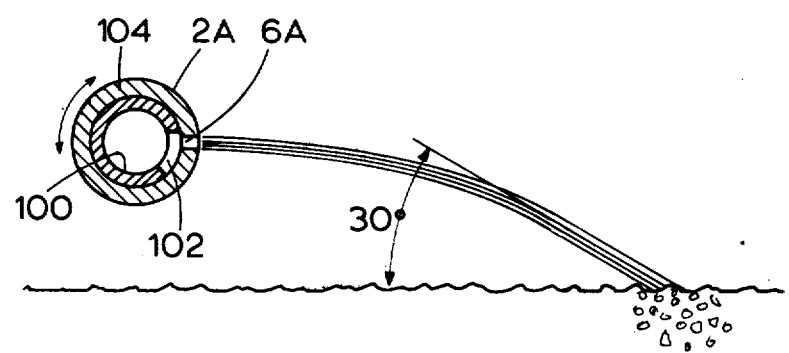
FIG. 3 is a transverse sectional view of a feed pipe having angularly adjustable outlet openings.
Figure 4:
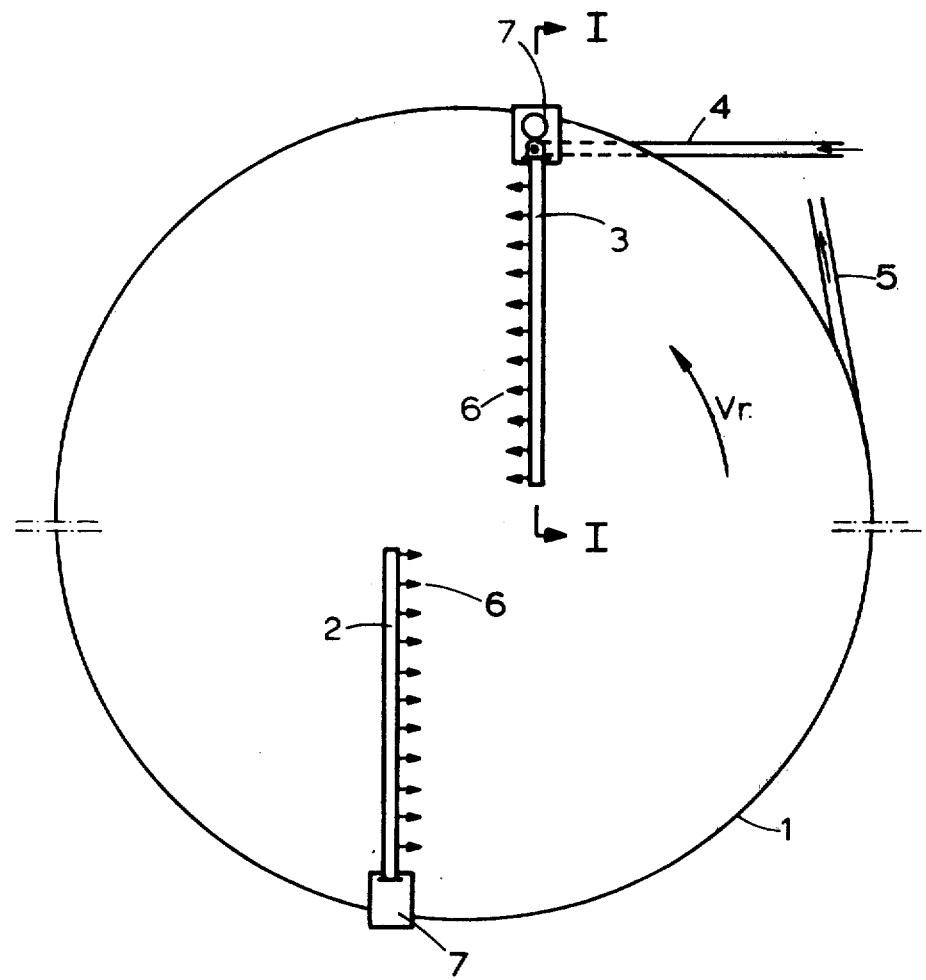
FIG. 4 is a schematic plan view of an elliptical embodiment of a plant embodying the principles of the present invention.

FIG. 3 illustrates a feed pipe assembly 2a having angularly adjustable outlet openings 6a and also illustrates a typical angular relationship between the direction of the waterjet and the surface of the water at the point where the jet strikes the surface. As shown, the feed pipe 2a includes a stationary innerpipe 100 having a relatively large opening 102 in its wall and an outer pipe 104 having the outlet openings 6a in its wall. The outer pipe 104 slidably engages the inner pipe 100 and is rotatable relative thereto. In the illustrated embodiment the axes of the outlet openings 6a are parallel to the surface of the water, and the angle at which the waterjet strikes the surface is about 30°. The horizontal component of the jet at the impingement point is substantially tangent to, i.e. parallel to, the circular main direction of the flow of the main body of water, at this point as illustrated in FIG. 3.

In the embodiment of FIGS. 1, 2 and 3, the circulatory flow of water in the vessel meets with comparatively little resistance if the waterjets are directed tangentially to the water flow direction Vr. With this relationship the horizontal components of these jets are parallel to the horizontal components of the resulting, mainly horizontally directed circular flow Vr at the places where the waterjets strike the water surface. In view of the extremely favorable hydrodynamic shape of the vessel, the frictional losses are then minimum. Moreover, if the waterjets are directed as described, the concentration of the air bubbles beaten into the water in the vessel 1 will be as uniform as possible, so that air lift action is suppressed, the residence time of the air bubbles in the water is prolonged, and, hence, the amount of oxygen dissolved is increased.

The equipment for carrying out the process according to the invention, therefore, includes a vessel over which there is a water feed tube with a number of outlet members for recycled water placed so as to effect the jets described above. The vessel is a regular polygonal reaction vessel which has practically the same cross-sectional shape at all levels. The discharge outlets are preferably controllable between 0° and 60°, with respect to a horizontal plane, and the overall device for recycling the water is so dimensioned that the velocity with which the recycled water leaves the outlet members can be 3 to 12 meters per second. The outlet members are so disposed that their axes are approximately parallel to the main direction of flow in the vessel at the tangent point.

EXAMPLE I

An example showing the efficiency of the oxygen introduction equipment included a cylindrical vessel as illustrated in FIGS. 1 and 2 having a diameter of 125 cm, filled with water up to a height of 110 cm. By means of a recirculation pump water was continuously drawn from the vessel and returned as a tangential waterjet through an outflow opening having a diameter of 21 mm, which was provided at 15 cm from the basin wall and at 10 cm over the water surface.

The angle between the waterjet and the water surface was 15°; the outflow velocity was $v_b$. The temperature of the water during the experiments was 18°–21° C.; the flow velocity of the water in the basin was 20–35 centimeters per second, which is sufficient to keep microbiological sludge in suspension.

At a flow velocity $v_b$ of 5, 6 meters per second, the oxygen introduction efficiency was 2,7 kg of $O_2$ per kWh of power expended. At a $v_b$ of 4, 2 meters per second, the oxygen introduction efficiency was 3,1 kg of $O_2$ per kWh.

EXAMPLE II

In an installation as described in FIG. 1 a number of experiments were carried out. This installation was a full scale municipal water purification plant, designed for a community of 9000 persons.

The vessel was round with a diameter of 26,8 m (surface area: 564,1 m²), filled with water to a height of 4 meters. Water was continuously withdrawn from the basin by a propeller pump having a variable propeller speed, and returned to the basin by the same pump in the form of 35 waterjets. The area of the discharge outlets was 0,013 m². The angle between the waterjets and the surface was 45°.

In the table a number of variables are listed. These are the mean values contained in a number of experiments.

Table 1

| | propeller-speed (rps) | Oxygen dissolved kg $O_2$/h | W/m³ | $V_j$ m/s | $V_b$ cm/s | O.C. kg $O_2$/kWh | F |
|---|---|---|---|---|---|---|---|
| 1 | 1000 | 21,9 | 5 | 4,4 | 45 | 1,9 | 0,52 |
| 2 | 1500 | 54,2 | 12 | 5,3 | 78 | 2,0 | 0,63 |

In which is:
Oxygen dissolved: is the total amount of oxygen (kg) that is dissolved per hour in the basin.
W/m³: The total electric energy used by the pump per second divided by the contents of the vessel.
$V_j$: Velocity of liquid in jet
$V_b$: Velocity of liquid in basin
O.C.: Oxygenation capacity, that means the amount of oxygen dissolved divided by the amount of energy used.
F: Sludge suspension factor, as defined herein before.
From table 1, it follows clearly, that the process and installation according to the invention have a good oxygenation capacity and are, without loss of efficiency, adaptable to widely differing loads. The possible load of the installation, with a high propeller speed, is 2.4 times as high as with the lower speed.

EXAMPLE III

Further experiments were carried out in a vessel as used in Example I with an angle between waterjet and water surface of 60° instead of 15°. At a $v_b$ of 6,3 meters per second the oxygen introduction efficiency was 1,8 kg of $O_2$ per kWh; at a $v_b$ of 4,3 meters per second it was 2,2 kg of $O_2$ per kWh.

In the following table a number of experiments are listed, in which experiments the sludge suspension factor is determined. From this table it follows that below the value of 0.10 the sludge will settle.

Table II

| | K | A | I | Q | V cosα | F | |
|---|---|---|---|---|---|---|---|
| 1 | 5/32 | 17 | 1.5 | 0.12 | 8.9 | 0.54 | good suspension |
| 2 | 5/32 | 34 | 1.5 | 0.07 | 6.9 | 0.52 | good suspension |
| 3 | 5/32 | 4 | 0.2 | 0.01 | 3.0 | 0.12 | fair suspension |
| 4 | 5/32 | 8 | 0.2 | 0.004 | 0.96 | 0.067 | sludge settle |
| 5 | 5/32 | 2 | 0.2 | 0.009 | 2.2 | 0.07 | sludge settle |

While the invention has been described herein, it is to be understood that the invention is not to be limited to the disclosed embodiment but on the contrary, it is intended to cover the various modifications and equivalent arrangements included within the spirit and scope of the appended claims.

What we claim is:

1. A process for aerating waste water containing suspended biologically active sludge in a vessel comprising:
   (a) circulating waste water within the vessel through one continuous substantially horizontal endless path so that the active sludge remains in suspension and is thoroughly mixed throughout the vessel;
   (b) withdrawing waste water from the vessel and recirculating that withdrawn water back to the vessel in the form of a number of regularly divided, downwardly inclined waterjets located above the surface of the waste water along one or more located above the surface of the waste water along one or more radii of the vessel so that all the waterjets are directed in the circulation direction, using at least one discharge tube located above the surface of the water in the vessel and having a plurality of outlet openings spaced from one another so as to extend along the length of the discharge tube, and wherein the step of recirculating waste water includes passing the withdrawn waste water through said at least one discharge tube;
   (c) controlling the velocity and positioning of the waterjets so that the velocity of the waterjets ranges between about 3 to about 12 meters per second and the angle of the jets is not greater than 60°.
   whereby the stream emitted in the form of waterjets has a horizontal component at the point the stream strikes the waste water that is substantially parallel to the circulation direction within the vessel thereby minimizing the energy imparted to the waterjets, entraining air within the waste water in the vessel and maintaining the substantially horizontal circulation in the vessel;
   (d) employing a sludge suspension factor of at least 0.10 determined according to the following equation:
   $$F = K\sqrt{A \cdot 1000/I \cdot (Q \times V \times \cos\alpha)}$$
   where:
   F = sludge suspension factor
   I = surface area of the vessel (m²)
   A = number of waterjets
   Q = average amount of liquid per jet (m³/s)
   V = velocity of liquid in jet (m/s)

α = angle between jet and surface at the point where they meet

K = constant factor, dependent on the shape of the basin.

2. Process as in claim 1 wherein the outflow velocity of the jets is from about 4 to 8 meters per second.

3. A process as in claim 1 wherein the jet is directed to strike the water surface at an angle between 0° and 45°.

4. A process as in claim 1 wherein the jet is directed to strike the water surface at an angle between 10° and 20°.

5. A process as in claim 1 wherein the withdrawn waste water is returned through discharge outlets where the outlet flow from each waterjet has a diameter of about 21 mm to about 128 mm.

6. A process as in claim 1 wherein the vessel includes a plurality of discharge tubes each extending not more than halfway across the vessel and the step of recirculating waste water includes the additional step of dividing the withdrawn water between the plurality of discharge tubes.

7. Apparatus for handling waste water containing biologically active sludge in a manner that continuously circulates waste water through one continuous substantially horizontal endless path within a vessel so that sludge is kept in suspension of substantially uniform concentration allowing efficient aeration of all parts of the suspension, said apparatus comprising:

a vessel having a predetermined cross-sectional shape;

said vessel holding a body of waste water to be treated;

supply means for supplying fresh waste water to said vessel and outlet means for removing treated waste water following treatment;

at least one discharge tube supported within said vessel and extending at least halfway across the width thereof and positioned above the body of waste water held therein, said at least one discharge tube having a plurality of discharge openings arranged to extend along the length thereof so that waterjets are formed that are all directed in the circulation direction, said openings having a diameter ranging from about 21 mm to about 128 mm;

pump means connected to said at least one discharge tube for withdrawing a quantity of waste water from the body of waste water and for delivering the withdrawn quantity to said discharge tube at a predetermined pressure so that the waterjets have a velocity ranging between about 3 to about 12 meters per second;

said discharge tube being positioned so that the angle of the jets of water discharged therefrom strike the surface of the waste water at an angle less than 60° so that the horizontal component of the jets is substantially parallel to the circulation path at the point the jets strike the waste water thereby entraining air within the body of the waste water while simultaneously maintaining the sludge within said vessel in suspension and at substantially uniform concentrations.

8. Apparatus as set forth in claim 7 wherein the suction side of said pump means is connected to said fresh waste water supply means.

9. Apparatus as in claim 7 wherein said discharge tube includes a stationary inner pipe provided with means defining a plurality of relatively large openings therein and an outer pipe rotatably mounted on said inner pipe and having means defining a plurality of relatively smaller openings therein aligned with said larger openings in said inner pipe.

10. Apparatus as in claim 9 wherein the axis of said smaller openings in said outer pipe are substantially parallel to the surface of said waste water in said vessel.

11. Apparatus as in claim 7 wherein the vessel has a regular polygonal, circular or elliptical shaped horizontal cross section.

12. Apparatus as in claim 7 wherein the discharge openings are spaced apart regularly along the length of said discharge tube.

13. Apparatus as in claim 7 wherein the discharge tube is located along one or more radii of the vessel.

14. A process for aerating waste water as in claim 1 wherein the vessel has a circular shape and K has a valve of 5/32.

15. A process for aerating waste water as in claim 1 where the vessel has an elliptical shape and K has a value of 3/32.

* * * * *